(12) United States Patent
Snider et al.

(10) Patent No.: US 7,328,565 B2
(45) Date of Patent: Feb. 12, 2008

(54) KNIFE GUARD CONSTRUCTION FOR SICKLE KNIFE

(75) Inventors: Geoffrey U. Snider, Winnipeg (CA); David J. Jordan, Broken Arrow, OK (US); Francois R. Talbot, Winnipeg (CA)

(73) Assignee: MacDon Industries Ltd., Winnipeg, Manitoba (CA)

(*) Notice: Subject to any disclaimer, the term of this patent is extended or adjusted under 35 U.S.C. 154(b) by 0 days.

(21) Appl. No.: 11/736,162

(22) Filed: Apr. 17, 2007

(65) Prior Publication Data
US 2008/0006016 A1 Jan. 10, 2008

Related U.S. Application Data

(60) Provisional application No. 60/818,524, filed on Jul. 6, 2006.

(51) Int. Cl.
*A01D 34/13* (2006.01)
*A01D 34/18* (2006.01)

(52) U.S. Cl. .......................................... 56/298; 56/309

(58) Field of Classification Search ................ 56/298, 56/309, 307, 305, 310, 257, 296, 299, 311, 56/264, DIG. 17, DIG. 20
See application file for complete search history.

(56) References Cited

U.S. PATENT DOCUMENTS

| | | | | |
|---|---|---|---|---|
| 1,652,238 A | * | 12/1927 | Crawford | 56/311 |
| 2,203,982 A | * | 6/1940 | Coultas et al. | 56/305 |
| 2,484,630 A | * | 10/1949 | Magee | 56/309 |
| 3,490,215 A | * | 1/1970 | Chapman et al. | 56/298 |
| 3,553,948 A | | 1/1971 | White | |
| 3,577,716 A | | 5/1971 | McCarty | |
| 3,978,645 A | * | 9/1976 | Bennett et al. | 56/310 |
| 4,012,891 A | * | 3/1977 | Steuerwald | 56/305 |
| 4,236,370 A | | 12/1980 | Shaver | |
| 4,246,742 A | | 1/1981 | Clark | |
| 4,387,554 A | * | 6/1983 | Bedogni | 56/296 |
| 4,519,192 A | * | 5/1985 | Oppenhuisen et al. | 56/298 |
| 4,644,738 A | | 2/1987 | Krambeck | |
| 4,660,361 A | | 4/1987 | Remillard | |
| 4,894,979 A | | 1/1990 | Lohrentz | |
| 4,909,026 A | | 3/1990 | Molzahn | |
| 5,209,053 A | * | 5/1993 | Verbeek | 56/298 |
| 6,708,476 B1 | * | 3/2004 | Blakeslee et al. | 56/296 |

* cited by examiner

*Primary Examiner*—Árpád Fábián Kovács
(74) *Attorney, Agent, or Firm*—Adrian D. Battison; Michael R. Williams; Ryan W. Dupuis (57) ABSTRACT

The center sickle overlap arrangement of a sickle type mower for a cutter bar that include a pair of sickles for reciprocating motion where each sickle is essentially half the length of the cutter bar for reduced forces and vibrations for high speed cutting. In the center, the sickle blades overlap at only guard and the blade of one sickle is inverted and co-operates with a top ledger surface of the associated guard so that both the blades are in proper shearing arrangement with the respective guard ledgers. Further the top ledger surface is adjustable to allow clearance adjustment to ensure tight clearance between all sickle cutting surfaces and guard ledgers. Further the arrangement ensures that all crop is cut between sickle sections and guard ledgers rather than between a pair of sections on the opposing sickles.

24 Claims, 8 Drawing Sheets

KNIFE GUARD CONSTRUCTION FOR SICKLE KNIFE

This application claims the benefit under 35 U.S.C. 119 of the filing date of Provisional Application 60/818,524 filed Jul. 6, 2006.

This invention relates to a sickle knife type cutter and particularly to a knife guard construction for use for use in cooperating with the knife blades in a cutting action either at a center between two opposed sickle bars or at any point along a sickle bar.

BACKGROUND OF THE INVENTION

The present invention relates to a crop cutting device comprising:

a frame structure arranged for forward travel over ground having a standing crop thereon;

a cutter bar secured to the frame structure and extending transversely across a front end of said frame structure;

a plurality of knife guards mounted in spaced relation along said cutter bar and projecting forwardly therefrom in transverse alignment;

each of said guards having an upwardly facing ledger surface with opposed side edges thereof arranged to provide first and second shearing edges;

at least one sickle bar;

the sickle bar being mounted in transversely extending position and being driven for reciprocating movement relative to said knife guards;

the sickle bar having a plurality of knife blades mounted thereon for movement therewith;

each of the knife blades having a bottom cutting surface for passing across the upwardly facing ledger surface of the knife guards in a shearing action and a top opposed surface;

each of the knife blades having two side cutting edges which are chamfered from the top opposed surface down to the cutting surface to cooperate with the shearing edges of said knife guards;

each of the first and second sickle bars being driven by a distance substantially equal to the distance between two knife guards such that each knife blade moves from a position at the outboard end of each stroke generally aligned with one of the knife guards to a position at the inboard end of each stroke generally aligned with a next adjacent knife guard.

The term "sickle bar" as used herein is intended to refer generally to a structure which supports all of the knife blades at the spaced positions along its length and is not intended to be limited to a single continuous element extending along the whole length of the structure. Thus the bar may be formed of different elements at different parts of the length and may include pieces below and above the blades.

It is well known that many sickle knives of this general type include a conventional or pointed guard where the guard is formed as an integral element which includes a base piece attached to the cutter bar and defining the ledger surface and a nose piece projecting forwardly from the ledger surface in front of the front edge of the blade which is generally pointed at a leading end so as to separate the crop to each side of the guard. This nose piece also stands up in front of the ledger surface to protect the front edge of the blade and includes a rearwardly extending shelf over the ledger surface which forms a slot with the ledger surface through which the blade passes. Guards of this type include separate hold down members between the guards which apply downward pressure on the cutter bar to press the blades against the ledger surface.

Pointed guards generally feature a point with a cut slot that the sickles sections reciprocate in and out of. Various types of hold-down arrangement are used to apply pressure to the sickle to keep its shearing surface in close contact with the guard ledger as cutting occurs. Usually these are located between the guard point or at the rear edge of the sickles. Most are sheet metal and feature easy adjustment using a hammer or a simple single point threaded adjustment. By keeping the hold-downs separate from the guards fewer hold-downs than points may be used to reduce the cost and number of adjustments required. Pointed guards have found much favour in easier cutting conditions due to the ease of adjustment and superior performance.

Another form of guard is known as a stub guard which is formed in two separate pieces including a base piece which carries the ledger surface and a top piece which extends over the ledger surface. The pieces are separate and separately adjustable relative to the cutter bar so that the top piece can apply pressure onto the blade to press it onto the ledger surface. The pieces terminate at a front edge which is just behind the front edge of the blade so that the front edge of the blade is presented to the crop. As this front edge must have a significant width for strength, there is a risk that crop engages this front edge rather than the side cutting edges of the blade.

In tough cutting, stub or no-clog guards have found the most favour. Stub guards use a separate top and bottom guard pieces that spaced slightly more than one sickle thickness apart create a slot for the sickle to operate in. The front edge of the sickle section protrudes slightly past the front tip of the two guard sections. This feature is what originally gave stub-guards their non-clogging self-cleaning action. A major improvement in stub guard technology was made when fully adjustable top hold-down assemblies were introduced as shown in U.S. Pat. No. 4,894,979 (Lohrentz) issued Jan. 23, 1990 and in U.S. Pat. No. 4,909,026 (Molzahn) issued Mar. 20, 1990. These arrangements allowed the gap to be controlled much more precisely than previously so that the shearing surface of the blade was kept in close contact with the guard ledger surface. This adjustability allows the stub top to act as a much more effective hold-down than the hold-downs found on regular pointed guard systems.

One drawback of the stub guard system is that the blunt front edge of the section is fully exposed to the crop entering during the entire sickle stroke cycle. This presents a barrier to crop entry for any crop directly contacting the front edge of the section. The front edge must be blunt in order to avoid too narrow a point becoming too weak and vulnerable to breakage.

The pointed guard has an advantage of presenting a point to the incoming crop so that crop is effectively divided around it. This is especially advantageous when the sickle blade is at or near the end or start of each stroke and the blunt front edge is hidden partially or entirely within the guard slot. Since the sickle bar velocity is lowest at or near the end or start of each stroke this gives the pointed guard a considerable advantage.

The guards can be formed as single elements separately mounted on the guard bar or as double or even triple elements connected together side by side for common mounting and common adjustment relative to the guard bar.

U.S. Pat. No. 3,553,948 (White) issued Jan. 12, 1970 discloses a sickle bar of this general type which has a point in front of the ledger surface. However in this arrangement the point is located wholly in front of the ledger surface with no overhanging shelf extending rearwardly from the point over the ledger surface. In its place is provided a plate which is clamped to the guard bar and extends forwardly therefrom over the ledger surface to engage into a slot at the rear of the point. This acts to hold down the knife blade as it reciprocates across the ledger surface and also provides a resistance to upward bending of the point to overcome the tendency of the point to break when engaged by an obstacle at the ground surface.

Arrangements of this type are well known and very commonly used. In some cases the arrangement is of the double sickle type where each sickle bar is essentially half the length of the cutter bar and the cutter bars reciprocate in opposite phase to minimize vibrating mass and vibrations. Usually the sickle bars are timed so that they move in opposite directions so that vibrations induced into the cutter bar assembly are minimized. This allows higher knife speeds to be achieved and therefore higher ground speeds and productivity from the mower.

Several attempts have been made to perfect the area where the inboard ends of the sickles overlap during the inboard stroke near the center of the cutter bar assembly since this has always been a problem area subject to fast wear and/or poor cutting in tough cutting conditions.

U.S. Pat. No. 3,577,716 (McCarty) issued May 4, 1971 discloses a twin sickle assembly where a single endmost blade on one sickle bar overlaps with a single endmost blade on the other sickle bar during inboard stroke at a single guard point with one blade sliding directly on top of the other. The bottom blade is inverted relative to the other blades and particularly relative to the top blade across which it slides "to provide proper shearing relationship between the opposing sections." However, the shearing edges of the opposing blades as they move toward one another meet while at the centerline of the center guard point so that, if the cutting occurs as intended between the two blades, the crop is forced to bend around the side edges of the center guard point before being cut. Alternatively the crop may be cut as the blade enters the center guard point against the side edges of the center guard point. However, on the inboard stroke the shearing edges of both sections are spaced one section thickness from the guard ledger surface which is not desirable especially in tough cutting conditions. Further, on the outboard stroke the shearing edge of the inverted section is spaced one thickness from the guard ledger as it enters the next adjacent guard point.

U.S. Pat. No. 4,236,370 (Shaver) issued Dec. 2, 1980 discloses a twin sickle assembly where at the end of the inboard stroke at least two of the end sickle blades at the inboard end of one sickle bar overlap with at least two of the blades of the other sickle bar. One sickle bar is raised so that the overlapping blades of one slide directly on top of the other through a set of special guards, used only at the center, which have a slot which has a double height to allow passage of both blades simultaneously. At the end of the outboard stroke at least one section of one sickle bar overlaps with at least one of the other sickle bar. The upper blades on the upper knife in the overlap zone are inverted so that the cutting surfaces face upwardly to cut against upper ledger surface of the special guards. The lower sections have shearing surface facing down to cut against the lower ledger surfaces of the special center guards. The guard ledger surfaces and sickle blade shearing surfaces therefore are all properly in contact in this arrangement to provide a proper shearing action. However, careful analysis will reveal that the hold downs between the guards hold the sickle bars downwardly, so that the shearing relationship between the upper inverted sections and the upper shearing surface of the special center guards will not be held to tight tolerance especially as the guards and blades start to wear. Also with the double overlap of more than one end blade, a substantial amount of crop in the center overlap area gathers between opposing sickle sections both on inboard and outboard strokes. This means the cuffing occurs between the opposing sections as they pass each other around mid-stroke rather than against the guard ledger surfaces. The shearing surfaces between the downwardly facing blade and the upwardly facing inverted blade in this center area are two thicknesses of blade apart so that there is no proper shearing action, which is not desirable in tough cutting conditions.

U.S. Pat. No. 4,246,742 (Clark) issued Jan. 27, 1981 discloses a twin sickle bar arrangement where during the inboard stroke two end sickle blades on each sickle bar overlap with the blades of one sliding directly on top of the blades of the other and cooperate with guards which have a double height slot. On the outboard stroke one blade of one sickle bar overlaps one blade of the other. The blades on the upper sickle bar in the overlap zone have their shearing surfaces facing down to cut against the blades of the lower sickle bar. The lower blades in the overlap area have square non-bevelled edges to provide a good ledger surface for the top blades to cut against. In this arrangement some cutting occurs between the opposing blades as they pass each other around mid-stroke. However, some crop gathers between the blades and the guards and has to be cut by the blade as it enters the guard slot. The shearing surface of the top blades is spaced by the thickness of a blade from the guard upper ledger surface which is not desirable in tough cutting conditions. Furthermore the crop gathered between the bottom square edged non-bevelled blades and guards must be cut without the benefit of a sharpened bevelled edge.

U.S. Pat. No. 4,644,738 (Krambeck) issued Feb. 24, 1987 discloses a twin sickle bar arrangement where a single end sickle blade on each sickle bar overlaps during inboard stroke at a single center guard with one blade sliding directly on top of the other. This leaves the center guard open at the outboard stroke. The bottom blade is mounted with shearing edge down to provide proper shearing relationship between the blade and the guard ledger surface. An adjustable two pronged hold-down is used on top of the top blade in the center overlap area. However, the shearing edges of upper blade also face down, meaning that its shearing surface end up being one thickness below the hold-down and one thickness above the guard ledger surface on the inboard stroke. This is not desirable in tough cutting conditions.

U.S. Pat. No. 4,660,361 (Remillard) issued Apr. 28, 1987 assigned to the present assignee discloses a twin sickle bar arrangement where a single end blade from each sickle bar overlaps during the inboard stroke. Both blades have their shearing surfaces facing downwardly. A special center guard is provided with two vertically spaced, upwardly facing ledger surfaces. The sickle bars are arranged vertically apart so operate on the separate ledger surfaces at the special center guard. This arrangement provides correct shearing surface to ledger relationships between sickle blades and guards on both inboard and outboard strokes. However the provision of two vertically spaced ledger surfaces requires a large vertical spacing between the two blades and thus the two sickle bars. This interferes with the ability of the reel, which sweeps the crop past the guards, to be mounted close to and consistently relative to the cutting elements which is desirable for effective cut crop removal. Secondly there is no effective means of holding the shearing surfaces of the blades at close clearances to the guard ledger surfaces at the overlap.

SUMMARY OF THE INVENTION

It is one object of the invention to provide a center overlap arrangement for a double sickle mower.

According to one aspect of the invention there is provided a crop cutting device comprising:

a frame structure arranged for forward travel over ground having a standing crop thereon;

a cutter bar secured to the frame structure and extending transversely across a front end of said frame structure;

a plurality of knife guards mounted in spaced relation along said cutter bar and projecting forwardly therefrom in transverse alignment;

each of said guards having an upwardly facing ledger surface with opposed side edges thereof arranged to provide first and second shearing edges;

a first and a second sickle bar;

the first and second sickle bars being mounted in transversely extending position and being driven for reciprocating movement relative to said knife guards such that the first and second sickle bars reciprocate at the same frequency but in opposed phase;

inboard ends of said first and second sickle bars terminating in generally end to end relationship adjacent a mid position of said cutter bar such that the relative positions of said inboard ends vary during said reciprocating movement;

the first sickle bar having a plurality of knife blades mounted thereon for movement therewith including an endmost knife blade at an inboard end of the first sickle bar;

the second sickle bar having a plurality of knife blades mounted thereon for movement therewith including an endmost knife blade at an inboard end of the first sickle bar;

each of the knife blades having a cutting surface for passing across the ledger surface of the knife guards and an opposed surface;

each of the knife blades having two side cutting edges which are chamfered from the opposed surface to the cutting surface to cooperate with said shearing edges of said knife guards;

the knife guards including a center knife guard at which the first and second sickle bars meet in said generally end to end relationship;

each of the first and second sickle bars being driven by a distance substantially equal to the distance between two knife guards such that each knife blade moves from a position at the outboard end of each stroke generally aligned with one of the knife guards to a position at the inboard end of each stroke generally aligned with a next adjacent knife guard;

the endmost knife blade of the first sickle bar being arranged at a height higher than the endmost knife blade of the second sickle bar;

the first and second sickle bars and the endmost knife blades thereof being arranged such that, at an inboard end of each stroke of movement of the sickle bars, the endmost knife blade of the first sickle bar is located over the endmost knife blade of said second sickle bar at the center knife guard;

the first and second sickle bars and the endmost knife blades thereof being arranged such that, at an outboard end of each stroke of movement of the sickle bars, the endmost knife blade of the first sickle bar is moved to vacate the center knife guard and the endmost knife blade of the first sickle bar is moved to vacate the center knife guard;

the end most knife blade of the first sickle bar being inverted relative to the others of the knife blades such that the cutting surface is at the top and the opposite surface is at the bottom;

the center knife guard having a bottom ledger surface facing upwardly for cooperating with the cutting surface of the endmost cutting blade of the second sickle bar; and the center knife guard having a top ledger surface facing downwardly for cooperating with the cutting surface of the endmost cutting blade of the first sickle bar.

The concept of the invention is applied to both pointed and stub-type guard systems.

For strength of mounting reasons most modern guard systems feature at least two guard elements which are connected side by side together by lateral elements. However the present invention is not limited to such double guards but may include single or triple or even more guards in a single construction.

In both cases, the center knife guard preferably includes a base portion thereof which attaches to the cutter bar and carries the bottom ledger surface and the center knife guard includes a top portion thereof which carries the top ledger surface which top portion is adjustable upwardly and downwardly relative to the base portion so as to adjust the top portion and the top ledger surface relative to the end most knife blade of the first sickle bar.

In the arrangement where the knife guards are stub guards, a forward edge of each knife blade generally will project forwardly of a forward edge of the base portion of the knife guard and a forward end of the top portion.

In the arrangement where the knife guards are pointed guards, each has a front crop engaging section in front of the ledger surface and standing upwardly from the ledger surface for extending forwardly from the front edge of the knife blade at the ledger surface to engage crop in advance of the front edge of the knife blade.

In this arrangement, preferably at least the center knife guard of the pointed guards has an adjustment portion separate from the base portion and located on top of the base portion above the ledger surface, the adjustment portion providing the upper ledger surface and being aligned with the base portion so as to define a space therebetween through which the knife blade passes, and the adjustment portion being adjustable upwardly and downwardly relative to the ledger surface so as to adjust the space therebetween through which the knife blade passes.

Preferably a front edge of the adjustment portion is behind a rear edge of the pointed element Preferably the adjustment portion is supported at a rear end such that adjustment thereof causes a forward end to be moved upwardly and downwardly relative to the ledger surface.

Preferably the forward end of the adjustment portion is free to move upwardly and downwardly relative to a rear edge of the front crop engaging section.

Preferably a rear end of the adjustment portion is adjustably carried on the cutter bar.

Preferably a forwardmost edge of the adjustment portion is located behind the front crop engaging section.

Preferably each of the pointed guards has an adjustment portion separate from the base portion and located on top of the base portion above the ledger surface, the adjustment portion being aligned with the base portion so as to define a space therebetween through which the knife blade passes, and the adjustment portion being adjustable upwardly and downwardly relative to the ledger surface so as to adjust the space therebetween through which the knife blade passes.

Preferably the width of the upper and lower ledger surfaces is substantially equal to ensure that the crop can be cut as soon as the sickle blade reaches the guard point without being deflected before being cut.

Preferably a next adjacent guard to the center guard has the lower ledger surface vertically positioned one section thickness higher than the lower ledger surface of the central guard point.

Preferably the inverted upper blade cuts against a top ledger surface of a next adjacent guard to the center guard which also has top and bottom ledger surfaces.

It is a further object of the present invention which is independent of the first object set forth above to provide an improved sickle knife of the type which uses pointed guards, which may be used only at the center guard of a double sickle arrangement or may be used generally as pointed guards of a sickle knife construction which has a single cutter bar or a double cutter bar.

In accordance with a second aspect of the invention there is provided a crop cutting device comprising:

a frame structure arranged for forward travel over ground having a standing crop thereon;

a cutter bar secured to the frame structure and extending transversely across a front end of said frame structure;

a plurality of knife guards mounted in spaced relation along said cutter bar and projecting forwardly therefrom in transverse alignment;

each of said guards having an upwardly facing ledger surface with opposed side edges thereof arranged to provide first and second shearing edges;

at least one sickle bar;

the at least one sickle bar being mounted in transversely extending position and being driven for reciprocating movement relative to said knife guards;

the at least one sickle bar having a plurality of knife blades mounted thereon for movement therewith;

each of the knife blades having a cutting surface for passing across the ledger surface of the knife guards, an opposed surface and a front edge;

each of the knife blades having two side cutting edges which are chamfered from the opposed surface to the cutting surface to cooperate with said shearing edges of said knife guards;

the at least one sickle bar being driven by a distance substantially equal to the distance between two knife guards such that each knife blade moves from a position at the outboard end of each stroke in which the knife blade lies on top of the ledger surface of one of the knife guards to a position at the inboard end of each stroke in which the knife blade lies on top of the ledger surface of a next adjacent knife guard;

wherein at least one of the knife guards comprises:

a base portion having a rear section mounted on the cutter bar and extending forwardly therefrom;

the base portion having a mid section in front of the cutter bar having said ledger surface defined by a surface thereof;

the base portion having a front crop engaging section in front of the ledger surface and standing from the ledger surface for extending forwardly from the front edge of the knife blade at the ledger surface to engage crop in advance of the front edge of the knife blade;

and an adjustment portion separate from the base portion and located adjacent the base portion facing the ledger surface;

the adjustment portion being aligned with the base portion so as to define a space therebetween through which the knife blade passes;

the adjustment portion being adjustable upwardly and downwardly relative to the ledger surface so as to adjust the space therebetween through which the knife blade passes.

In accordance with a third aspect of the invention there is provided a crop cutting device comprising:

a frame structure arranged for forward travel over ground having a standing crop thereon;

a cutter bar secured to the frame structure and extending transversely across a front end of said frame structure;

a plurality of pointed knife guards mounted in spaced relation along said cutter bar and projecting forwardly therefrom in transverse alignment;

each of said pointed knife guards having an upwardly facing ledger surface with opposed side edges thereof arranged to provide first and second shearing edges;

at least one sickle bar;

the at least one sickle bar being mounted in transversely extending position and being driven for reciprocating movement relative to said pointed knife guards;

the at least one sickle bar having a plurality of knife blades mounted thereon for movement therewith;

each of the knife blades having a cutting surface for passing across the ledger surface of the pointed knife guards, an opposed surface and a front edge;

each of the knife blades having two side cutting edges which are chamfered from the opposed surface to the cutting surface to cooperate with said shearing edges of said pointed knife guards, the at least one sickle bar being driven by a distance substantially equal to the distance between two pointed knife guards such that each knife blade moves from a position at the outboard end of each stroke in which the knife blade lies on top of the ledger surface of one of the pointed knife guards to a position at the inboard end of each stroke in which the knife blade lies on top of the ledger surface of a next adjacent pointed knife guard;

wherein each of the pointed knife guards comprises:

a base portion having a rear section mounted on the cutter bar and extending forwardly therefrom:

the base portion having a mid section in front of the cutter bar having said ledger surface defined by a surface thereof;

the base portion having a pointed front crop engaging section in front of the ledger surface and standing from the ledger surface for extending forwardly from the front edge of the knife blade at the ledger surface to engage crop in advance of the front edge of the knife blade;

and an adjustable hold down portion separate from the base portion and located adjacent the base portion facing the ledger surface;

the adjustable hold down portion being aligned with the base portion so as to define a space therebetween through which the knife blade passes so as to hold down the blade onto the ledger surface to effect a shearing action;

the adjustable hold down portion being adjustable upwardly and downwardly relative to the ledger surface so as to adjust the space therebetween through which the knife blade passes.

Preferably as described hereinafter the base portion is at the bottom and the adjustable hold down portion is on the top. However it is possible but less desirable that this arrangement may be inverted so that the adjustable hold down portion s at the bottom.

The embodiments described hereinafter provide constructions where all of the sickles cutting blades in the center overlap are located and arranged so as to be in proper shearing arrangement the respective guard ledgers.

The arrangement uses a single overlap at the fully inboard position so that so that the end section of one sickle is directly superimposed on the end section of the other knife at a single guard point position, spaced vertically apart by approximately one section thickness. This overlap occurs at a center cutter bar which is generally at center of the cutter bar but not necessarily if the two sickles differ in length. The center guard actually consists of upper and lower parts each with a ledger surface. At the center point the arrangement features separate top and bottom guards both with ledger surfaces so that cutting can occur against the top or bottom guard depending on sickle section orientation. The ledger surfaces at this central point are spaced vertically slightly more than two sickle section thicknesses apart since they are occupied by two blades when the sickles are in their fully inboard position.

During the outboard stroke the center blades move in opposite directions towards the adjacent guard points. As the knives move outboard, crop gathered between the end blades and the adjacent guard points gets severed at the leading edges of the adjacent guard point ledger surfaces. On the outboard stroke the inverted upper blade cuts against the top ledger surface of the adjacent point which also features matching top and bottom ledger surfaces. These are spaced only slightly more than one section thickness apart since they are never occupied by more than one section. The lower non-inverted end blade of the other sickle bar cuts in the conventional manner against its adjacent to center guard point. At the fully outboard position the end blades are at the adjacent guard points and the central guard point that was previously occupied by the two superimposed blades is now empty of blades.

During the inboard stroke both end blades again move toward the central guard point. Crop is gathered between the end sickle blades and is cut against both edges of the central guard point. The inverted top blade cuts against the top ledger surface of the central point while the lower blade cuts against the bottom ledger surface of the central guard point. During the inboard stroke the second to last blade of the upper sickle cuts against the lower ledger surface of the adjacent guard point. Note that at this guard point the lower ledger is surface is vertically positioned one blade thickness higher than the lower ledger surface of the central guard point.

In the arrangement shown one inverted section at the end of the upper knife is used. Alternatively more than one inverted section could be used in some less advantageous arrangements, as long as additional points with upper and lower ledgers are provided. However this is not preferred.

The preferred arrangement of the single overlap at the central point ensures that all crop is gathered between sickle blades and guard ledgers rather than between the blades on opposing knives as with other designs that overlap more than one section on the inboard stroke.

The width of the ledgers surfaces is the same top and bottom to ensure that the crop can be cut as soon as the sickle blade reaches the guard point without being deflected before being cut.

Thus as described above, all of the sickles cutting elements in the center overlap are in proper shearing arrangement the respective guard ledgers.

Another feature of the arrangement as described in the embodiments herein is to allow clearance adjustment to ensure tight clearance between all blade cutting surfaces and the respective guard ledger surfaces. At the guards with upper ledger surfaces the upper portion of the guard is mounted to an adjuster bar. This adjuster bar has threaded fasteners that allow the gap between the upper guard ledger surfaces and lower ledger surfaces to controlled precisely.

For strength of mounting reasons most modern guard systems have at least two points which are connected together by lateral elements.

In the embodiment shown the two points that are occupied by the inverted end section of the upper knife during inboard and outboard strokes consist of an upper and lower guard each with two connected points. The bottom guard mounts directly to the frame element while the upper guard is connected to the frame with the aforementioned adjuster bar. Other mounting arrangements between the upper guard portion and the guard bar may be used.

The ledger surfaces of the two upper guard points are preferably in the same vertical position. The bottom guard features two ledger surface vertically spaced one section thickness apart. This allows the central guard point to have its ledger surfaces spaced two blade thicknesses apart while the adjacent point has then spaced one blade thickness apart.

As an alternative the top guard can be offset.

In conventional guards the lateral elements connecting the guard points generally consist of a trash bar near the rear of the cutting zone that prevents the crop from moving rearward and a wear bar at the rear of the sickle bar that supports the blades and the lateral bars that connect the blades together. In the preferred embodiment both the top and bottom guard portions have these lateral elements for maximum strength and support of both sickles. Alternatively one or both of these elements could be omitted from either guard.

The stub guard arrangement features a unique bottom guard at as previously described at center with ledger surfaces vertically offset by the thickness of one sickle section. For the top guard at the center a conventional bottom guard can be inverted and mounted to a conventional adjuster bar to provide the upper ledger surfaces. The rest of the guards on the cutter bar are conventional stub style bottoms with conventional adjuster bar and conventional stub hold-downs.

In the pointed guard arrangement there is provided a unique bottom guard as previously described at the center with ledger surfaces vertically offset by the thickness of one sickle blade. The conventional tang or shelf that usually covers the top of the section is absent to allow for the top guard to be used. The top guard is formed with two points with but with blunt front edges and ledger surfaces closely matching in width to the ledger surfaces of he bottom guard. The top guard is mounted to an adjuster bar that allows fine vertical adjustment. Another unique feature of the bottom guard is a raised projection at the front of the ledger surface that covers the front edges of the sickle blades and top guard. This prevents crop material from entering from the front and clogging the guard.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

In FIGS. 1 to 5 is shown a first embodiment of a crop cutting device generally indicated at 10. Only a part of the complete machine is shown since the remainder of the machine may vary widely depending upon requirements and since the construction is of course well known to a person skilled in the art. In this embodiment as shown, there is a frame generally indicated at 11 which of course forms only one part of the total frame structure that is the part of the frame that is relevant to the present invention.

The cutting device 10 further includes a cutter bar 12 attached to the frame structure 11. Thus the frame structure 11 in the part as shown comprises a guard bar 13 to which is attached a plurality of knife guards 14. The guard bar 13 is attached to a cutter bar 15 along the front edge of a frame structure which supports the guard bar in fixed position across the front edge of the frame for a cutting action of the crop cuffing device on the standing crop.

The knife guards 14 are arranged in pairs and mounted on the guard bar 13 at spaced positions along the length of the guard bar. In the embodiment as shown, only three of the pairs of guards are shown but it will be appreciated that there are additional guards as required to provide a crop cutting device of a required width.

The knife guards are basically of a conventional construction in that each includes a lower portion 15 and an upper portion 16. These two portions are mounted on the guard bar 13 by a mounting arrangement 17 including bolts 18. The mounting arrangement thus attaches a rear end 19 of the lower portion 15 rigidly on the underside of the bar 13 so that the guard projects forwardly from the bar to a front nose 20. Similarly the upper portion 16 is mounted on the guard bar 13 by an adjustment plate 21 attached onto the same bolts 18. Upper portion 16 extends forwardly to a nose 22.

In the embodiment shown the guards are stub guards so that the nose of the upper and lower portions substantially overlie one another and confine between them the blades 23 of the sickle bar 24.

Figure 1:
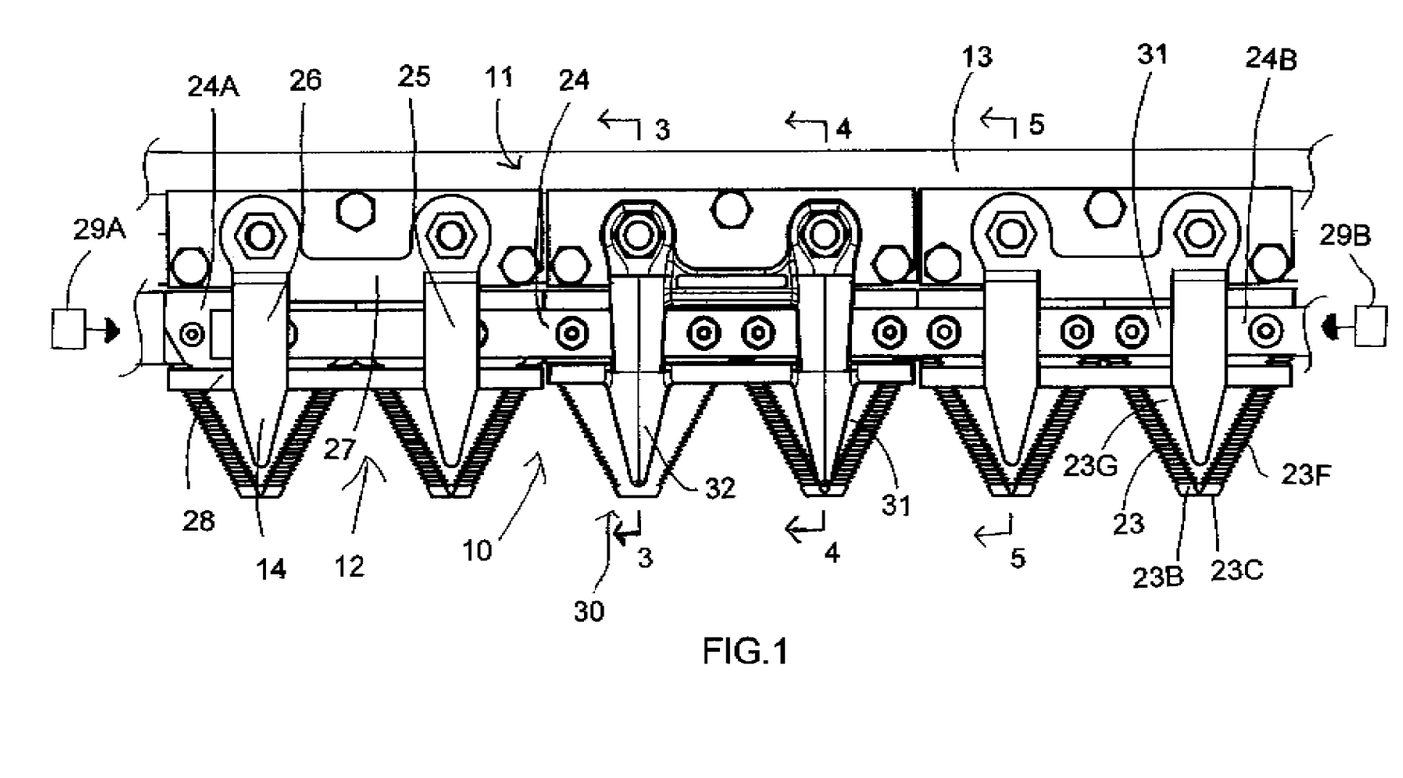
FIG. 1 is a top plan view of a portion of a header showing a center section of a sickle knife of a type including two sickles which overlap at the center section and using stub-type guards.

Each pair of guards thus includes two guard elements each defined by an upper portion and a lower portion and the guard elements are shown in FIG. 1 at 25 and 26 with these guard elements being connected by a bar 27. A front crop guide bar 28 is also provided. Between the mounting bar 26 and the front guide bar 28 is provided a channel within which the sickle bar 24 is mounted for reciprocating movement.

In the embodiment shown there are two sickle bars including a first sickle bar 24A and a second sickle 24B. The bar 24A is driven by a reciprocating drive motor 29A and symmetrically the bar 24B is driven by reciprocating drive motor 29B. These drive motors are arranged at opposite ends of the sickle bar so that the sickle bars meet at a central guard generally indicated at 30. Each of the sickle bars is driven by the reciprocating drive motor such that the bar reciprocates by a distance equal to the space between each of the guards along the guard bar 13.

Each sickle bar comprises a support bar member 31 and the plurality of blades indicated at 23. Each of the blades forms a generally triangular-shaped member which has a rear end bolted to the bar and converges from the rear end to a front end 23B. The front end is blunt first to provide a leading edge 23C. Each of the blades has a top surface 23D and a bottom surface 23E. Each of the blades has a side edge 23F and a second side edge 23G. The sides edges are chamfered from the top surface down to the bottom surface 23E so that a sharp edge is formed at the bottom surface at each of the side edges.

Figure 2:
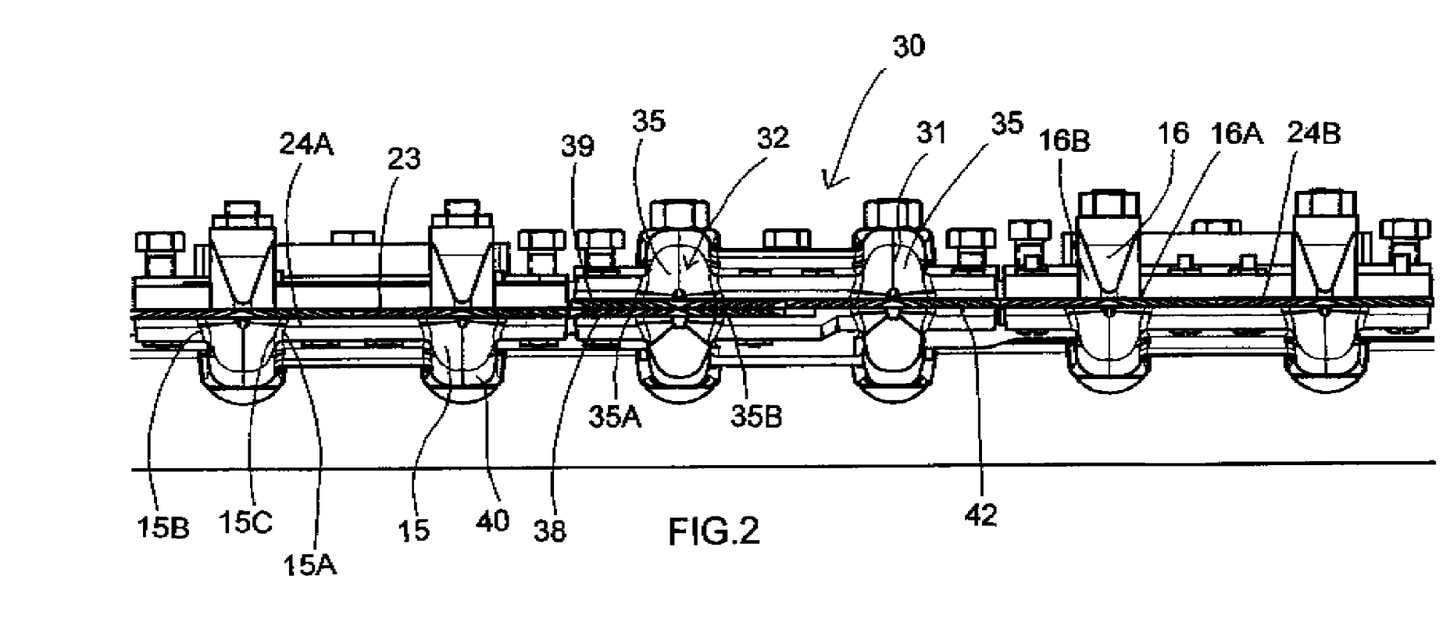
FIG. 2 is a front elevational view of the sickle knife of FIG. 1.
Figure 5:
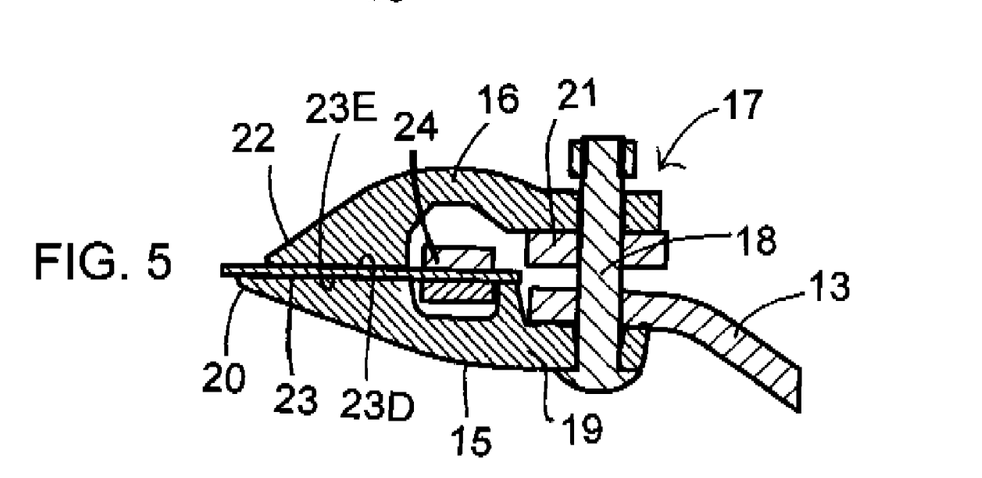
FIG. 5 is a cross sectional view along the line 5 of FIG. 1.

Along the full length of each of the sickle blades 24A and 24B apart from the center guard 30, the construction is of a conventional nature as shown in FIG. 5 with the blade configuration as described above. The top member 16 acts to hold the blades downwardly into engagement with the top surface of the bottom portion 15. The bottom portion 15 has two side edges as best shown in FIG. 2 with those side edges 15A and 15B acting as side edges of a ledger surface 15C defined across the top of the bottom portion 15. Thus the cutting action of the blades occurs between the ledger 15C and the bottom surface of the blade as the blade reciprocates from its position at one of the guards to its position at the next adjacent one of the guards. In this cuffing action, therefore, the side edge of the blade moves across the space between the guards and enters onto the ledger surface of the guard in a cutting action between the bottom surface of the blade and the top surface of the guard which are immediately adjacent and either in contact or closely adjacent position to provide a shearing action on the crop.

In these conventional guards, the upper portion 16 acts merely as a hold down member contacting the upper surface of each of the blades so as to apply pressure to that upper surface and hold it in contact with or closely adjacent the ledge surface of the bottom portion where the cutting action occurs. The upper portion therefore as shown in FIG. 2 has side surfaces 16A and 16B which are narrower than the side edges of the bottom portion 15.

The mounting and adjustment arrangements for the bottom portion 15 and the other portion 16 are shown only schematically and not described in detail since these can vary in accordance with a number of different designs readily available to a person skilled in the art. It suffice to say that the hold down portion 16 is adjustable so that the gap between the bottom surface of the hold down portion and the ledger surface of the bottom portion 15 can be adjusted to allow the sliding action of the blades while holding the blades in the required position.

This construction is well known and widely used in sickle knife cutting systems of this type.

In the center section where the two sickle blades meet is provided the specially designed center guard 30 having its two guard portions 31 and 32. These two guard portions are shown in cross section in FIGS. 3 and 4 respectively. These guard portions are modified relative to the conventional guard portions, one of which is shown in cross section in FIG. 5. The guards 31 and 32 are modified so that the upper portion 35 also provides a ledger surface 36 at the bottom surface with that ledger surface facing downwardly. Thus it will be noted from FIG. 2 that the upper portion 35 and each of the guards 31 and 32 has side edges 35A and 35B which match the width of the underlying bottom portion 15 which includes the same conventional upper ledger surface 23E as previously described. Thus in addition the upper portion 35 extends to a nose 37 which has the same length as the nose 20 of the bottom portion 15. Thus the upper and lower portions of these guards are generally symmetrical. In a further modification, it will be noted that the ledger surfaces of the guards 31 and those to the right of the guard 31 are elevated relative to the ledger surfaces of the bottom portion of the guard 32 and those to left of the guard 32. Thus the blades 23 of the bar 24A slide over the ledger surfaces of those guards with an endmost one of the blades as indicated at 38 sliding underneath an endmost one 39 of the blades of the bar 24B. The amount of elevation is equal to the thickness of the blades so that the endmost blade 39 of the bar 24B sits directly on top of and substantially in contact with the endmost blade 38 of the bar 24A.

The arrangement is such that there is only a single overlap blade and this overlapping occurs at the inboard end of the stroke which is illustrated in FIG. 2. In this position both of the blades are arranged in overlying position at the guard 32. When the bars are moved outwardly to the outboard end of the stroke, the blade 38 vacates the guard 32 and moves to the guard indicated at 40. Also the blade 39 vacates the guard 32 and moves to the guard 31.

The blade 38 is inverted relatively to all the remaining blades. The blade is of a symmetrical or identical to all of the remaining blades such that it has one surface which forms a cutting surface and an opposed surface where the sides are chamfered from the opposed surface to the cutting surface. In this position, however, the blade 39 is inverted so that the cutting surface is at the top rather than at the bottom. However the blade along side the blade 39 which is indicated at 42 is of the conventional orientation that is with its cutting surface downward for Co-operation with the bottom ledger surface of the guard defined by the bottom portion 15.

Figure 3:
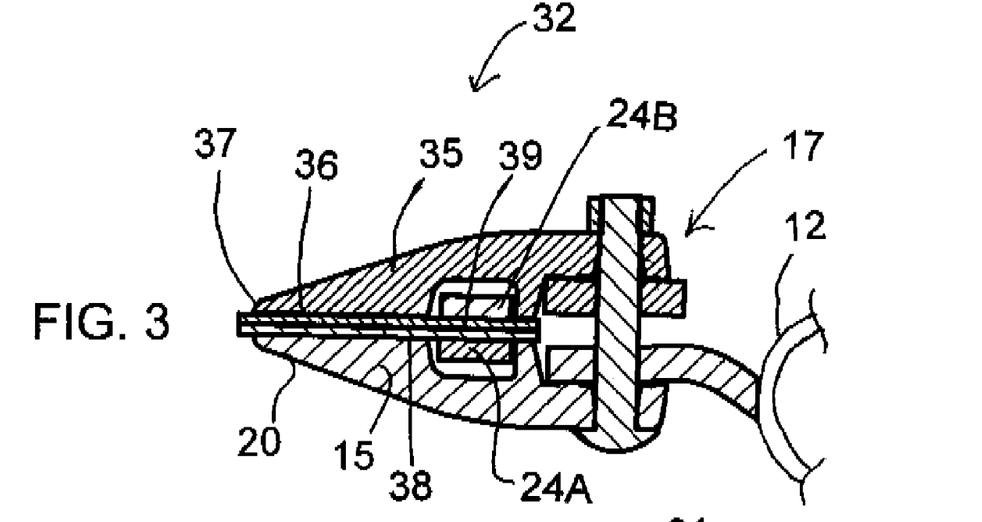
FIG. 3 is a cross sectional view along the line 3 of FIG. 1.

Thus as shown in FIG. 3, the blade 39 sits directly on top of the blade 38. The blade 39 is driven by the bar 24B and the blade 38 is driven by the bar 24A. At this location the bar 24B is formed by a supplemental bar portion which is on top of the blades at the end of the sickle blade construction so that the bar 24B does not interfere with the bar 24A on the underside of the blade 38 and the remaining blades along that bar. The bar 24A may be increased in length beyond the end blade to provide a guide portion assisting movement of the end blade through the guards. The side edges of the blades at the position behind the chamfered cutting section may have curved upper edges to prevent interference between the blades as they overlap, particularly when the height of the blades has varied due to wear on the bar.

The blade 39 which is inverted thus moves between the guards 31 and 32 in its reciprocating action. Since each of these guards has an upper portion 35 with a bottom ledger surface acting as a cutting surface having side edges for co-operating with the side edges of the blade 39, an effective cutting action occurs as that blade moves between those two guards. The guard 32 also has a bottom ledger surface for co-operating with the blade 38. The guard 31 also has a bottom ledger surface for co-operating with the next adjacent blade of the bar 24B.

Figure 4:
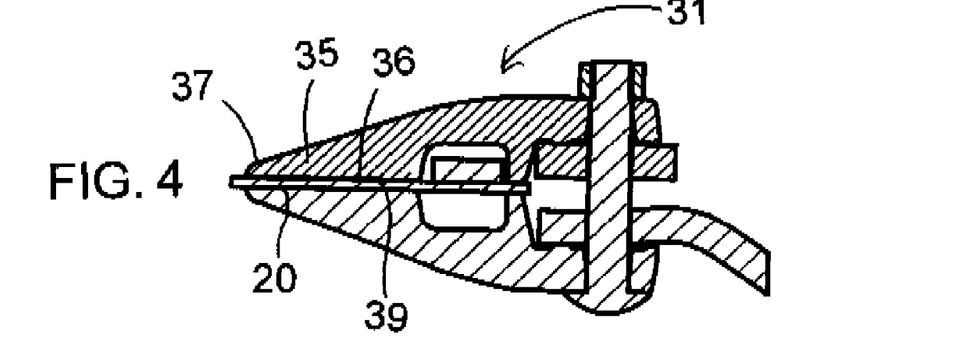
FIG. 4 is a cross sectional view along the line 4 of FIG. 1.

The guard 32 is adjusted as shown in FIG. 3 to provide a double space between the upper and lower ledger surfaces. This adjustment is obtained by adjusting the upper portion 35 on the mounting assembly 17. Conventional adjustment arrangements can be provided as known to a person skilled in this art. As shown in FIG. 4 the same construction at the guard 31 is adjusted so that there is only a single spacing for receiving the blade 39 or its next adjacent blade as it passes through the guard 31.

Thus a proper cutting action is provided at each of the guards along the length of the sickle bar. In each cutting action the cutting occurs between the sharpened surface of the blade and an immediately adjacent the ledger surface of the guard. As there is only a single overlapping blade at the inboard end of the stroke, there is no cutting action which occurs between blade surfaces as they move together since the cutting action of each of those blades occurs between the blade itself and its respective ledger surface of the guard.

Figure 6:
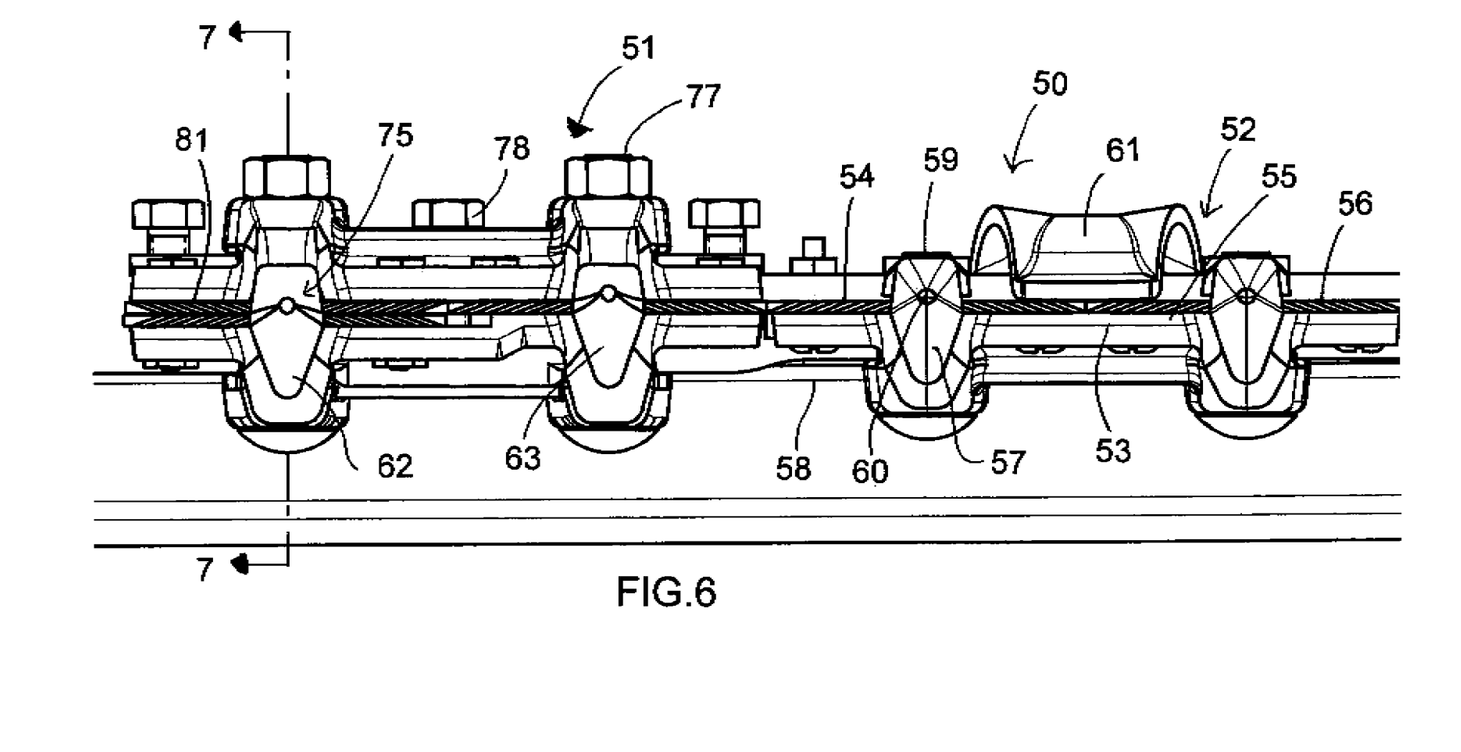
FIG. 6 is a front elevational view of a second embodiment of a sickle knife according to the present invention utilizing pointed-type guards.
Figure 7:
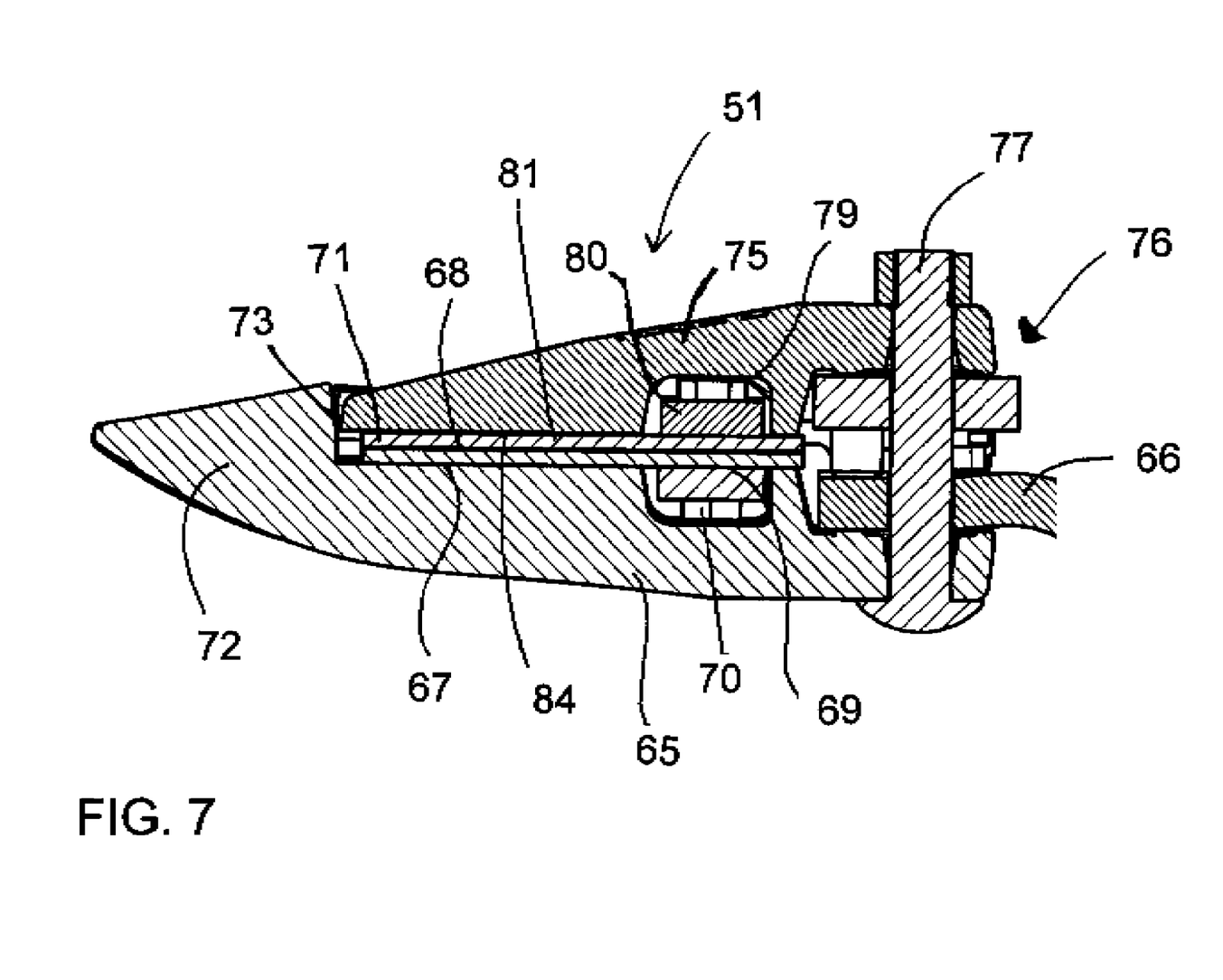
FIG. 7 is a cross sectional view along the lines 7-7 of FIG. 6.

Turning now to the embodiment shown in FIGS. 6 and 7, this embodiment shows a similar arrangement to that described above when used in conjunction with pointed guards. Thus in FIG. 6 there are shown three separate guard pairs indicated at 50, 51 and 52 respectively. The guard 50 forms one of a plurality of such guards co-operating with a sickle bar 53 carrying blades 54. Guard 52 forms one of a plurality of such guards co-operating with a bar 55 carrying blades 56. The central guard 51 is a special guard somewhat similar to the central guard of the arrangement previously described.

As is well known pointed guards 50 and 52 include a bottom portion 57 mounted on the guard bar 58. The bottom portion 57 includes a ledger surface over which the blades reciprocate together with an overhanging portion 59. The overhanging portion 59 and the bottom portion 57 converge to a nose 60 in front of the blade. The pointed guards thus are advantageous relative to the stub guards in that the nose 60 acts as a crop divider and there is less possibility for the crop to engage the front edge at the blunt blades of the embodiment previously described containing stub guards. In this arrangement there is a central hold down unit 61 between the two pointed guards of the pair 50 or the pair 52. This arrangement if of course entirely conventional and the guard itself together with the hold down are mounted on the bar 58 in a manner which allows adjustment in conventional manner using different arrangements as known to one skilled in the art.

The central special guard 51 is shown in cross section in FIG. 7. Again it will be appreciated that this comprises a pair of guard elements 62 and 63 which are similar in construction and similar to the arrangement shown cross section in FIG. 7.

Thus each of the guards includes a bottom portion 65 which is carried on the guard bar 66. This bottom portion 65 includes a ledger surface 67 over which the blade 68 reciprocates in a cutting action. The blade 68 is carried on a bar 69 forming part of the sickle bar. This runs in a channel 70 in the bottom portion 65. The bottom portion 65 extends forwardly beyond the front edge 71 of the blade 68 into a nose 72 which projects forwardly and provides a raised surface 73 in front of and thus protecting the front edge of the blade. The front edge of the blade can thus be protected from engagement with the crop and the crop is divided by moving along one side or the other of the nose 72. Conventionally the surface of the nose 72 communicates with a shelf or tang which engages over the blade and forms a slot within which the blade slides.

However in this arrangement the surface 73 forms a shoulder at the front edge of the blade and there is no portion extending rearwardly from that portion. In its place is provided a hold down adjustable element 75 which is mounted on the guard bar 66 by an adjustment mechanism 76 carried on the bolts 77 of the guard bar which allows the position of the hold down portion 75 to be adjusted by bolts 78 thus shown in FIG. 6. The upper hold down portion 75 includes a channel 79 within which the bar 80 of the upper knife element 81 runs.

As in the previous embodiment the guard element 62 is arranged to receive overlying blades 68 and 81 in the inboard end of the stroke where the blade elements overlap. Again the blade 81 is inverted relative to the remaining blades so that its upper surface forms the cutting surface with the side edges chamfered away from that cutting surface to the opposed surface. All of the remaining blades are of the conventional orientation with the cutting surface at the bottom and the top surface containing the chamfered sections.

The upper hold down element 75 is formed with a bottom ledger surface 84 which co-operates with the upper cutting surface of the blade 81. Thus the width of the upper portion 75 is equal to the width of the bottom portion 65 at the ledger surface to provide side edges of that ledger surface which co-operate in a shearing action with the respective blades. Thus at the guard elements 62, the bottom blade 68 of the bar 55 co-operates with the bottom ledger surface and the upper blade 81 co-operates with the top ledger surface of the portion 75.

At the guard 63, the upper portion is adjusted to provide only a single thickness for receipt of the blade of the bar 53. However in this guard again there are provided both the upper and lower ledger surfaces so that the upper ledger surface can co-operate with the inverted end blade 81 and the bottom ledger surface can co-operate with the next adjacent or penultimate blade which is in the normal orientation.

Again therefore an effective cutting action is provided with each of the blades properly co-operating with an immediate adjacent ledger surface. Cutting action occurs only between the side edges of the blade and the side edges of the ledger surface without the necessity of any cutting occurring between surfaces which are more widely spaced which can interfere with the proper shearing action of the crop.

Figure 8:
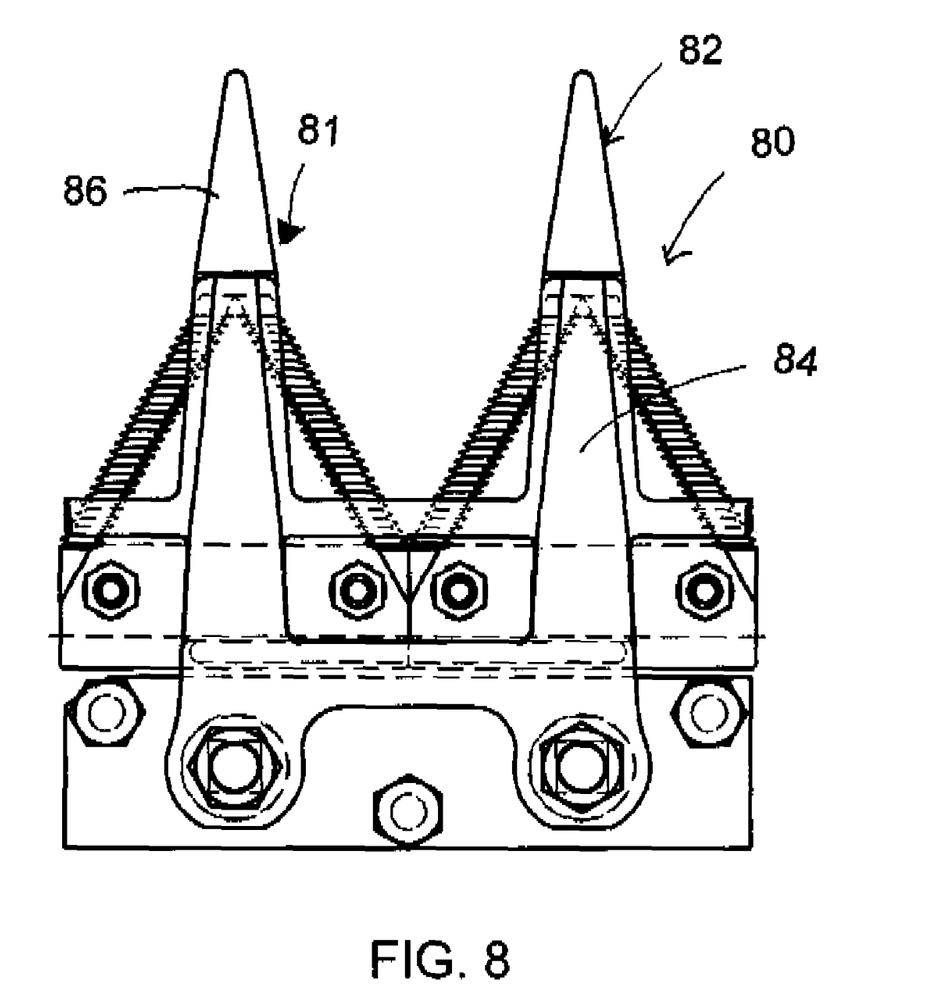
FIG. 8 is top plan view of one section of a further embodiment of a sickle knife of the type which uses pointed guards.
Figure 9:
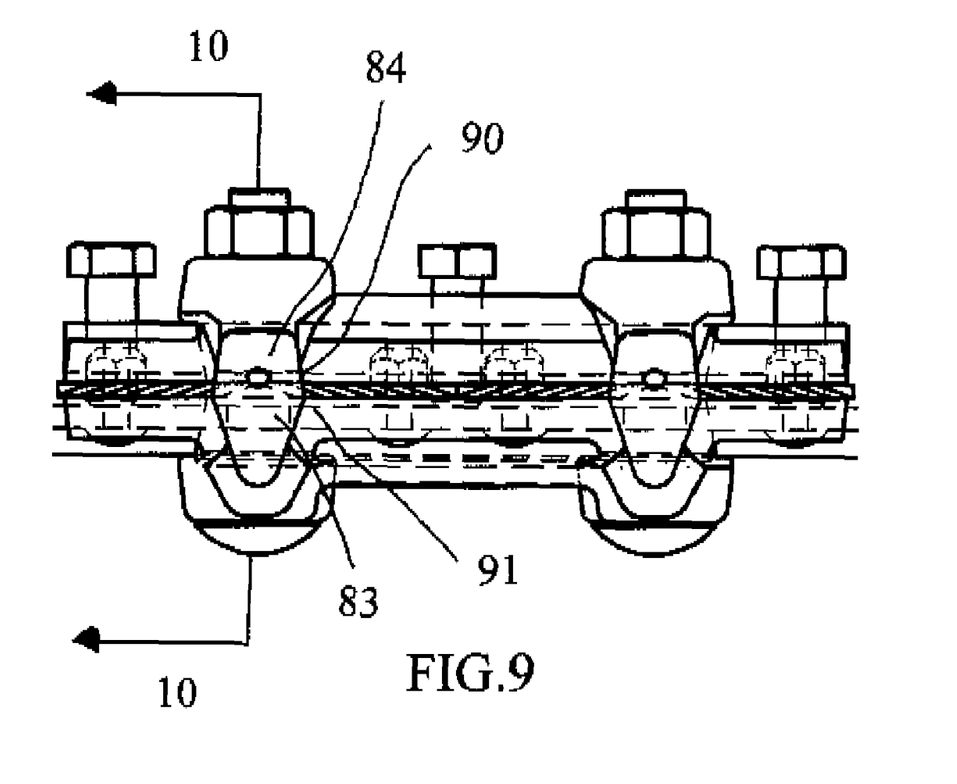
FIG. 9 is a front elevational view of the section of FIG. 8.
Figure 10:
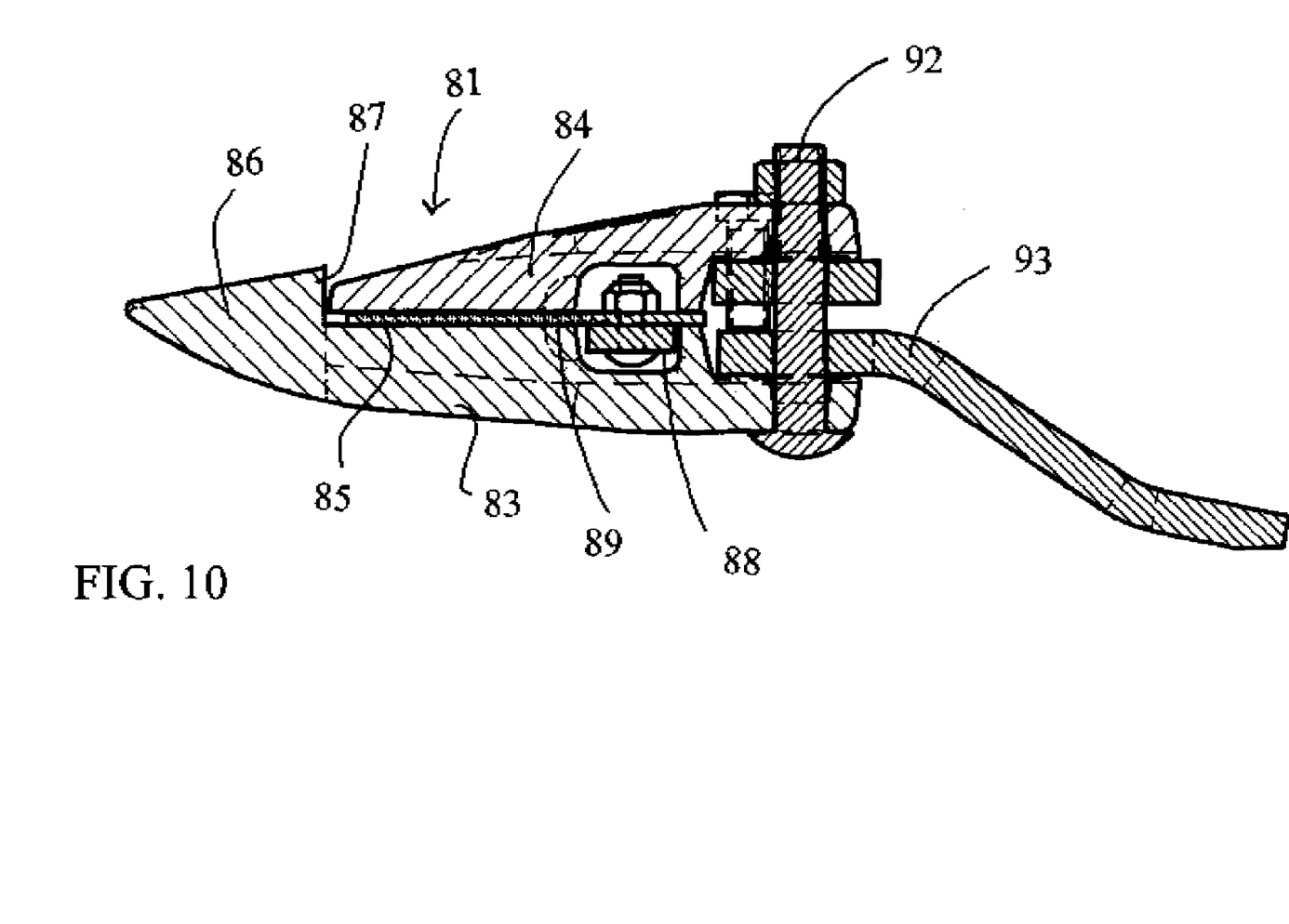
FIG. 10 is a cross sectional view along the lines 10-10 of FIG. 9.

Turning now to FIGS. 8, 9 and 10, there is shown a sickle knife which is formed wholly of pointed guards where all of the guards are of the type including an adjustable hold down element. Thus each of the guards is of the type generally indicated in FIG. 8 at 80 and includes a pair of pointed guard elements 81 and 82. Each of these has a bottom portion 83 as shown in FIG. 10 together with an adjustable top portion 84. The bottom portion 83 has a ledger surface 85 and projects forwardly from the ledger surface into a pointed portion 86 defining a rear shoulder 87 at the rear of the pointed portion 86 and in front the ledger surface 85. The guard co-operates with a bar 88 carrying blades 89. The hold down portion 84 is directly aligned with the bottom portion 83 and has side edges 90 which are slightly narrower that the side edges 91 of the bottom portion 83 so that the crop cutting action occurs on the ledger surface 85 with the chamfered side edges of the blades 85 and their bottom cutting surface. The hold down portions 84 are adjustable upwardly and downwardly on the bolts 92 in conventional manner relative the guard bar 93. In this way the top hold down portion 84 can be adjusted upwardly and downwardly relative to the ledger surface 85 and behind the shoulder 87 so as to provide a close tolerance for holding the blade surface onto the ledger surface in the cutting action. At the same time the pointed nose 86 and the shoulder 87 protect these elements for engagement with the crop so that the crop is split and divided in conventional manner by the nose 86 in the manner of a conventional pointed guard. However instead of providing the fixed shelf or ledger surface over the blade and instead of holding the blade down by hold down elements such as those elements 61 which are located between the guards, the hold down portion 84 is directly aligned with the bottom portion of the guard to provide a more effective hold down and a more close tolerance for pressing the cutting surface of the blade onto the ledger surface. The hold down action occurs at the location where the blade tends to lift in the cutting action rather than at a position offset from the cutting action of the guard.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop cutting device comprising:

a frame structure arranged for forward travel over ground having a standing crop thereon;

a cutter bar secured to the frame structure and extending transversely across a front end of said frame structure;

a plurality of knife guards mounted in spaced relation along said cutter bar and projecting forwardly therefrom in transverse alignment;

each of said guards having an upwardly facing ledger surface with opposed side edges thereof arranged to provide first and second shearing edges;

a first and a second sickle bar;

the first and second sickle bars being mounted in transversely extending position and being driven for reciprocating movement relative to said knife guards such that the first and second sickle bars reciprocate at the same frequency but in opposed phase;

inboard ends of said first and second sickle bars terminating in generally end to end relationship adjacent a mid position of said cutter bar such that the relative positions of said inboard ends vary during said reciprocating movement;

the first sickle bar having a plurality of knife blades mounted thereon for movement therewith including an endmost knife blade at an inboard end of the first sickle bar;

the second sickle bar having a plurality of knife blades mounted thereon for movement therewith including an endmost knife blade at an inboard end of the first sickle bar;

each of the knife blades having a cutting surface for passing across the ledger surface of the knife guards and an opposed surface;

each of the knife blades having two side cutting edges which are chamfered from the opposed surface to the cutting surface to cooperate with said shearing edges of said knife guards;

the knife guards including a center knife guard at which the first and second sickle bars meet in said generally end to end relationship;

each of the first and second sickle bars being driven by a distance substantially equal to the distance between two knife guards such that each knife blade moves from a position at the outboard end of each stroke generally aligned with one of the knife guards to a position at the inboard end of each stroke generally aligned with a next adjacent knife guard;

the endmost knife blade of the first sickle bar being arranged at a height higher than the endmost knife blade of the second sickle bar;

the first and second sickle bars and the endmost knife blades thereof being arranged such that, at an inboard end of each stroke of movement of the sickle bars, the endmost knife blade of the first sickle bar is located over the endmost knife blade of said second sickle bar at the center knife guard;

the first and second sickle bars and the endmost knife blades thereof being arranged such that, at an outboard end of each stroke of movement of the sickle bars, the endmost knife blade of the first sickle bar is moved to vacate the center knife guard and the endmost knife blade of the first sickle bar is moved to vacate the center knife guard;

the end most knife blade of the first sickle bar being inverted relative to the others of the knife blades such that the cutting surface is at the top and the opposite surface is at the bottom;

the center knife guard having a bottom ledger surface facing upwardly for cooperating with the cutting surface of the endmost cutting blade of the second sickle bar; and the center knife guard having a top ledger surface facing downwardly for cooperating with the cutting surface of the endmost cutting blade of the first sickle bar.

2. The crop cutting device according to claim 1 wherein the center knife guard includes a base portion thereof which attaches to the cutter bar and carries the bottom ledger surface and the center knife guard includes a top portion thereof which carries the top ledger surface which top portion is adjustable upwardly and downwardly relative to the base portion so as to adjust the top portion and the top ledger surface relative to the end most knife blade of the first sickle bar.

3. The crop cutting device according to claim 2 wherein the knife guards are stub guards such that a forward edge of each knife blade projects forwardly of a forward edge of the base portion of the knife guard and a forward end of the top portion.

4. The crop cutting device according to claim 1 wherein the knife guards are pointed guards such that each has a front crop engaging section in front of the ledger surface and standing upwardly from the ledger surface for extending forwardly from the front edge of the knife blade at the ledger surface to engage crop in advance of the front edge of the knife blade.

5. The crop cutting device according to claim 4 wherein at least the center knife guard of the pointed guards has an adjustment portion separate from the base portion and located on top of the base portion above the ledger surface, the adjustment portion being aligned with the base portion so as to define a space therebetween through which the knife blade passes, and the adjustment portion being adjustable upwardly and downwardly relative to the ledger surface so as to adjust the space therebetween through which the knife blade passes.

6. The crop cutting device according to claim 5 wherein a front edge of the adjustment portion is behind a rear edge of the pointed element.

7. The crop cutting device according to claim 5 wherein the adjustment portion is supported at a rear end such that adjustment thereof causes a forward end to be moved upwardly and downwardly relative to the ledger surface.

8. The crop cutting device according to claim 5 wherein the forward end of the adjustment portion is free to move upwardly and downwardly relative to a rear edge of the front crop engaging section.

9. The crop cutting device according to claim 5 wherein a rear end of the adjustment portion is adjustably carried on the cutter bar.

10. The crop cutting device according to claim 5 wherein a forwardmost edge of the adjustment portion is located behind the front crop engaging section.

11. The crop cutting device according to claim 4 wherein each of the pointed guards has an adjustment portion separate from the base portion and located on top of the base portion above the ledger surface, the adjustment portion being aligned with the base portion so as to define a space therebetween through which the knife blade passes, and the adjustment portion being adjustable upwardly and downwardly relative to the ledger surface so as to adjust the space therebetween through which the knife blade passes.

12. The crop cutting device according to claim 1 wherein the width of the upper and lower ledger surfaces is substantially equal to ensure that the crop can be cut as soon as the sickle blade reaches the guard point without being deflected before being cut.

13. The crop cuffing device according to claim 1 wherein a next adjacent guard to the center guard has the lower ledger surface vertically positioned one section thickness higher than the lower ledger surface of the central guard point.

14. The crop cutting device according to claim 1 wherein the inverted upper blade cuts against a top ledger surface of a next adjacent guard to the center guard which also has top and bottom ledger surfaces.

15. A crop cutting device comprising:
a frame structure arranged for forward travel over ground having a standing crop thereon;
a cutter bar secured to the frame structure and extending transversely across a front end of said frame structure;
a plurality of knife guards mounted in spaced relation along said cutter bar and projecting forwardly therefrom in transverse alignment;
each of said guards having an upwardly facing ledger surface with opposed side edges thereof arranged to provide first and second shearing edges;
at least one sickle bar;
the at least one sickle bar being mounted in transversely extending position and being driven for reciprocating movement relative to said knife guards;
the at least one sickle bar having a plurality of knife blades mounted thereon for movement therewith;
each of the knife blades having a cutting surface for passing across the ledger surface of the knife guards, an opposed surface and a front edge;
each of the knife blades having two side cutting edges which are chamfered from the opposed surface to the cutting surface to cooperate with said shearing edges of said knife guards;
the at least one sickle bar being driven by a distance substantially equal to the distance between two knife guards such that each knife blade moves from a position at the outboard end of each stroke in which the knife blade lies on top of the ledger surface of one of the knife guards to a position at the inboard end of each stroke in which the knife blade lies on top of the ledger surface of a next adjacent knife guard;

wherein at least one of the knife guards comprises:
  a base portion having a rear section mounted on the cutter bar and extending forwardly therefrom;
  the base portion having a mid section in front of the cutter bar having said ledger surface defined by a surface thereof;
  the base portion having a front crop engaging section in front of the ledger surface and standing to a height from the ledger surface for extending forwardly from the front edge of the knife blade at the ledger surface to engage crop in advance of the front edge of the knife blade;
  and an adjustment portion separate from the base portion and located adjacent the base portion so as to face the ledger surface;
  the adjustment portion being aligned with the base portion so as to define a space therebetween through which the knife blade passes;
  the adjustment portion being adjustable upwardly and downwardly relative to the ledger surface so as to adjust the space therebetween through which the knife blade passes.

16. The crop cutting device according to claim 15 wherein the adjustment portion is supported at a rear end such that adjustment thereof causes a forward end to be moved upwardly and downwardly relative to the ledger surface.

17. The crop cutting device according to claim 15 wherein the forward end of the adjustment portion is free to move upwardly and downwardly relative to a rear edge of the front crop engaging section.

18. The crop cutting device according to claim 15 wherein a rear end of the adjustment portion is adjustably carried on the cutter bar.

19. The crop cutting device according to claim 15 wherein a forwardmost edge of the adjustment portion is located behind the front crop engaging section.

20. A crop cutting device comprising:
  a frame structure arranged for forward travel over ground having a standing crop thereon;
  a cutter bar secured to the frame structure and extending transversely across a front end of said frame structure;
  a plurality of pointed knife guards mounted in spaced relation along said cutter bar and projecting forwardly therefrom in transverse alignment;
  each of said pointed knife guards having an upwardly facing ledger surface with opposed side edges thereof arranged to provide first and second shearing edges;
  at least one sickle bar;
  the at least one sickle bar being mounted in transversely extending position and being driven for reciprocating movement relative to said pointed knife guards;
  the at least one sickle bar having a plurality of knife blades mounted thereon for movement therewith;
  each of the knife blades having a cutting surface for passing across the ledger surface of the pointed knife guards, an opposed surface and a front edge;
  each of the knife blades having two side cutting edges which are chamfered from the opposed surface to the cutting surface to cooperate with said shearing edges of said pointed knife guards;
  the at least one sickle bar being driven by a distance substantially equal to the distance between two pointed knife guards such that each knife blade moves from a position at the outboard end of each stroke in which the knife blade lies on top of the ledger surface of one of the pointed knife guards to a position at the inboard end of each stroke in which the knife blade lies on top of the ledger surface of a next adjacent pointed knife guard;
  wherein each of the pointed knife guards comprises:
    a base portion having a rear section mounted on the cutter bar and extending forwardly therefrom;
    the base portion having a mid section in front of the cutter bar having said ledger surface defined by a surface thereof;
    the base portion having a pointed front crop engaging section in front of the ledger surface and standing to a height from the ledger surface for extending forwardly from the front edge of the knife blade at the ledger surface to engage crop in advance of the front edge of the knife blade;
    and an adjustable hold down portion separate from the base portion and located adjacent the base portion for facing the ledger surface;
    the adjustable hold down portion being aligned with the base portion so as to define a space therebetween through which the knife blade passes so as to hold down the blade onto the ledger surface to effect a shearing action;
    the adjustable hold down portion being adjustable upwardly and downwardly relative to the ledger surface so as to adjust the space therebetween through which the knife blade passes.

21. The crop cutting device according to claim 20 wherein the adjustment portion is supported at a rear end such that adjustment thereof causes a forward end to be moved upwardly and downwardly relative to the ledger surface.

22. The crop cutting device according to claim 20 wherein the forward end of the adjustment portion is free to move upwardly and downwardly relative to a rear edge of the front crop engaging section.

23. The crop cutting device according to claim 20 wherein a rear end of the adjustment portion is adjustably carried on the cutter bar.

24. The crop cutting device according to claim 20 wherein a forwardmost edge of the adjustment portion is located behind the front crop engaging section.

* * * * *